United States Patent
Imai et al.

(10) Patent No.: US 6,612,958 B2
(45) Date of Patent: Sep. 2, 2003

(54) OIL PRESSURE CONTROL APPARATUS OF CONTINUOUSLY VARIABLE TRANSMISSION

(75) Inventors: Norio Imai, Anjo (JP); Hiroshi Tanaka, Anjo (JP); Masashi Hattori, Anjo (JP)

(73) Assignee: Aisin Aw Co., Ltd. (JP)

( * ) Notice: Subject to any disclaimer, the term of this patent is extended or adjusted under 35 U.S.C. 154(b) by 12 days.

(21) Appl. No.: 10/012,362

(22) Filed: Dec. 12, 2001

(65) Prior Publication Data

US 2002/0086759 A1 Jul. 4, 2002

(30) Foreign Application Priority Data

Dec. 19, 2000 (JP) ........................ 2000-385821

(51) Int. Cl.[7] ............................ F16H 37/02; B60K 41/14
(52) U.S. Cl. ..................... 475/210; 475/209; 477/45
(58) Field of Search ........................ 475/61, 63, 64, 475/65, 69, 70, 127, 210, 209; 477/44, 45, 48

(56) References Cited

U.S. PATENT DOCUMENTS

| | | | | |
|---|---|---|---|---|
| 4,711,333 A | * | 12/1987 | Okamura | ............... 477/44 X |
| 4,712,453 A | * | 12/1987 | Haley | .................. 477/48 X |
| 4,735,113 A | * | 4/1988 | Yamamuro et al. | ....... 477/45 X |
| 4,829,433 A | * | 5/1989 | Nakano et al. | .......... 477/48 X |
| 5,050,715 A | * | 9/1991 | Itoh et al. | ................. 475/65 X |
| 5,052,990 A | * | 10/1991 | Sakakibara et al. | ........ 475/210 |
| 5,086,672 A | * | 2/1992 | Kato et al. | ................ 477/45 X |

FOREIGN PATENT DOCUMENTS

| | | | | |
|---|---|---|---|---|
| JP | 356080550 | * | 7/1981 | ............. 475/210 X |
| JP | 35161347 | * | 10/1982 | ................. 477/45 |
| JP | 363101561 | * | 5/1988 | ................. 477/45 |
| JP | 10-246317 | | 9/1998 | |

* cited by examiner

Primary Examiner—Charles A Marmor
Assistant Examiner—Ha Ho
(74) Attorney, Agent, or Firm—Lorusso, Loud & Kelly

(57) ABSTRACT

At the time of starting a vehicle, the torque capacity of a friction engagement element is made less than the torque capacity of a continuously variable transmission by setting a ratio between the pressure-receiving area of a control oil chamber (77a) of a garage shift control valve (77) and the pressure-receiving area of a feedback chamber (77d) of the valve, and a ratio between the pressure-receiving area of a control oil chamber (73a) of a secondary sheave control valve 73 and the pressure-receiving area of a feedback chamber 73d of the valve. This allows a control based on a single linear solenoid valve SLT although the control is for eliminating slip of a belt of the continuously variable transmission. Therefore, the construction of the oil pressure control apparatus is simplified so that the size and cost thereof can be reduced.

16 Claims, 9 Drawing Sheets

FIG. 3

OPERATION TABLE

|  | S1 | S2 | S3 | S4 |
|---|---|---|---|---|
| P | × | × | × | × |
| R | × | × | × | × |
| R control | ○ | × | × | × |
| N→R | × | × | ○ | ○ |
| N | × | × | × | × |
| N→D | × | × | ○ | ○ |
| D up | ◎ | △ | × | △ |
| D down | ◎ | △ | △ | × |

◎ : ON  L-UP ON
○ : OFF  L-UP OFF
△ : DUTY CONTROL

OIL PRESSURE CONTROL APPARATUS OF CONTINUOUSLY VARIABLE TRANSMISSION

INCORPORATION BY REFERENCE

The disclosure of Japanese Patent Application No. 2000-385821 filed on Dec. 19, 2000, including the specification, drawings and abstract, is incorporated herein by reference in its entirety.

BACKGROUND OF THE INVENTION

1. Field of the Invention

The invention relates to an oil pressure control apparatus of a continuously variable transmission for use in a vehicle, such as a motor vehicle or the like. More particularly, the invention relates to an oil pressure control apparatus that is suitable for use in a hydraulic control apparatus for controlling pulleys of a belt-type continuously variable transmission based on oil pressure and, more specifically, to an oil pressure control apparatus for controlling the oil pressure of a hydraulic servo for a friction engagement element that engages at the time of a start of the vehicle and the oil pressure of a hydraulic servo that applies torque to the continuously variable transmission though the use of one and the same pressure regulating device.

2. Description of the Related Art

A related-art oil pressure control apparatus for changing the oil pressure of a friction engagement element that engages at the time of a start of a vehicle, for example, a direct (input) clutch or the like, between the control pressure and the working pressure (range pressure) is disclosed in, for example, Japanese Patent Application Laid-Open No. HEI 10-246317. This apparatus has a neutral relay valve that is switched by a solenoid valve, and a control valve whose pressure is regulated by a linear solenoid valve. When a manual shift valve is switched from a neutral range to a drive range (N→D), the oil pressure control apparatus supplies the control pressure regulated by the control valve to a direct clutch hydraulic servo via a predetermined port of the neutral relay valve, and controls the control pressure so as to gradually rise through the use of an accumulator, so that the direct clutch is smoothly engaged. Then, the apparatus switches the neutral relay valve so as to shut off the control pressure and supply the range pressure from the manual shift valve to the hydraulic servo, so that the direct clutch is held in an engaged state.

According to the above-described related-art control of the direct clutch, at the time of switching the manual shift valve from the neutral range to the drive range (N→D), the control valve is controlled through pressure adjustment by the linear solenoid valve, and the direct clutch is engaged based on the control pressure, so that the vehicle can be smoothly started. The aforementioned linear solenoid valve is a dedicated valve for starting the vehicle. Therefore, separately from the linear solenoid valve for controlling the direct clutch hydraulic servo, it is necessary to provide a linear solenoid valve for controlling the oil pressure to be supplied to a secondary sheave hydraulic servo so that a predetermined torque capacity is given to the continuously variable transmission in accordance with the input torque. Therefore, since a plurality of linear solenoid valves are needed, the high price thereof increases the entire cost. Furthermore, the construction of the oil pressure control apparatus becomes complicated. Thus, the need for a plurality of linear solenoid valves impedes the size reduction of the continuously variable transmission and the cost reduction thereof.

SUMMARY OF THE INVENTION

Accordingly, it is an object of the invention to provide an oil pressure control apparatus of a continuously variable transmission in which a pressure regulating device can be used for various purposes, and therefore the construction is simplified so as to allow size and cost reduction.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a table of operation of the transmission;

DETAILED DESCRIPTION OF PREFERRED EMBODIMENTS

Preferred embodiments of the invention will be described hereinafter with reference to the accompanying drawings.

Figure 1:
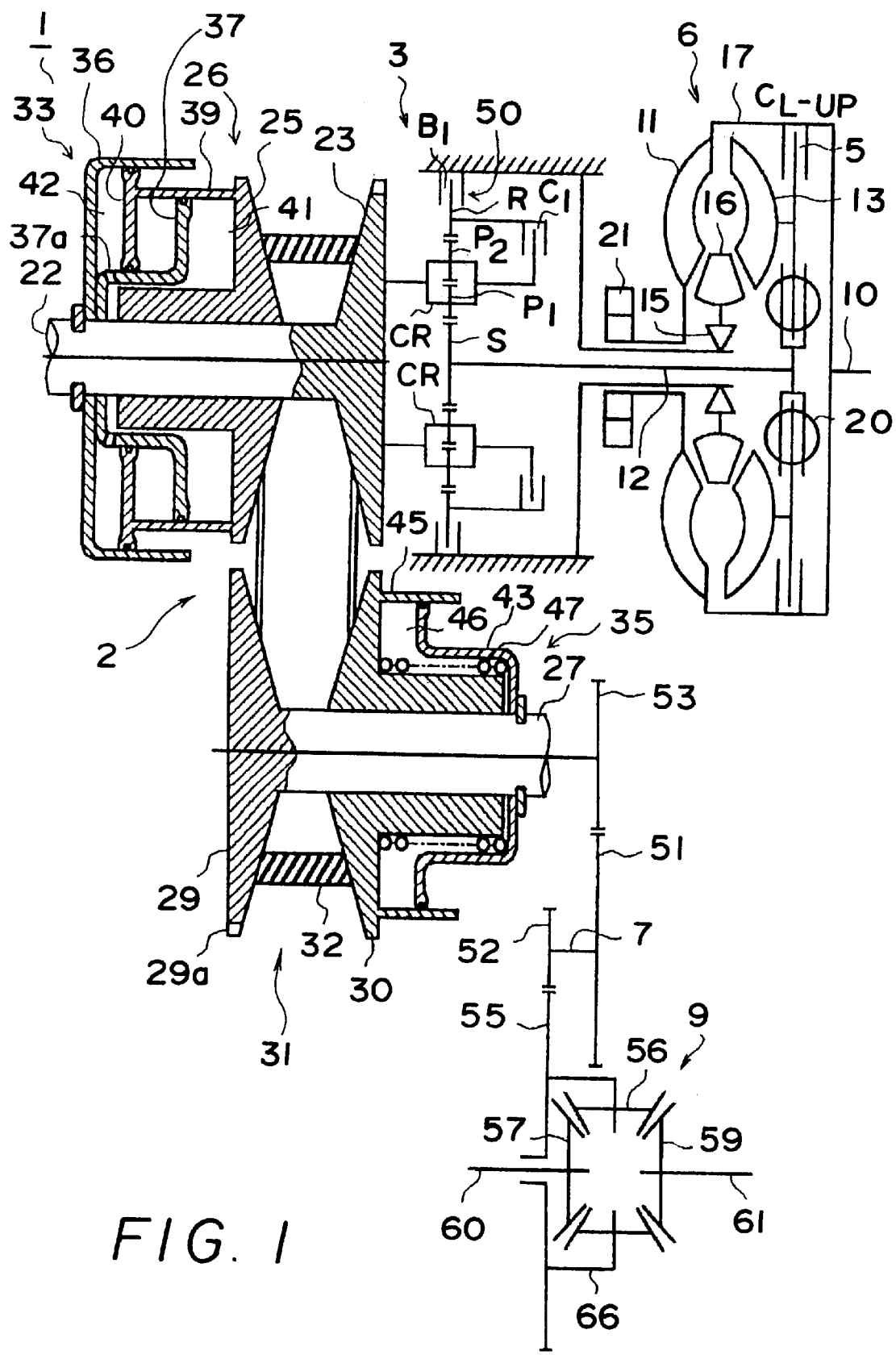
FIG. 1 is a diagram schematically illustrating a continuously variable transmission to which the invention is applied.

FIG. 1 is a diagram illustrating a vehicular continuously variable transmission 1 to which the invention is applicable. The continuously variable transmission 1 has a belt-type continuously variable transmission apparatus (CVT) 2, a forward-reverse drive switching device 3, a torque converter 6 containing a lockup clutch 5, a counter shaft 7, and a differential device 9. These devices and the like are housed in an integrated case formed by sectional portions.

The torque converter 6 includes a pump impeller 11 connected to an engine output shaft 10 via a front cover 17, a turbine runner 13 connected to an input shaft 12, and a stator 16 supported via a one-way clutch 15. The lockup clutch 5 is disposed between the input shaft 12 and the front cover 17. FIG. 1 also shows a damper spring 20 disposed between a lockup clutch plate and the input shaft 12, and an oil pump 21 connected to and driven by the pump impeller 11.

The belt-type continuously variable transmission apparatus 2 includes a primary pulley 26 that is formed by a stationary sheave 23 fixed to a primary shaft 22 and a movable sheave 25 supported on the primary shaft 22 movably only in a sliding fashion, a secondary pulley 31 that is formed by a stationary sheave 29 fixed to a secondary shaft 27 and a movable sheave 30 supported on the secondary shaft 27 movably only in a sliding fashion, and a metallic belt 32 trained around the two pulleys.

Furthermore, a hydraulic actuator 33 having a double-piston arrangement is disposed on a back side of the primary-side movable sheave 25, and a hydraulic actuator 35 having a single-piston arrangement is disposed on a back side of the secondary-side movable sheave 30. The primary-side hydraulic actuator 33 has a cylinder member 36 and a reaction force bearing member 37 that are fixed to the primary shaft 22, and a hollow-cylindrical member 39 and a piston member 40 that are fixed to the movable sheave 25. The hollow-cylindrical member 39, the reaction force bearing member 37 and a back surface of the movable sheave 25 define a first hydraulic chamber 41. The cylinder member 36 and the piston member 40 define a second hydraulic chamber 42. The first hydraulic chamber 41 and the second hydraulic chamber 42 are interconnected in communication via a communicating hole 37a. Therefore, the primary-side hydraulic actuator 33 produces a force in a direction of an axis which is approximately twice the force produced by the secondary-side hydraulic actuator 35. The secondary-side hydraulic actuator 35 includes a reaction force bearing member 43 fixed to the secondary shaft 27 and a hollow-cylindrical member 45 fixed to a back surface of the movable sheave 30. The two members define a hydraulic chamber 46. A pre-load spring 47 is disposed in a compressed state between the movable sheave 30 and the reaction force bearing member 43.

The forward-reverse drive switching device 3 has a double-pinion planetary gear 50, a reverse (reverse drive-purposed) brake $B_1$, and a direct clutch (forward drive-purposed clutch or an input clutch) $C_1$. In the planetary gear 50, a sun gear S is connected to the input shaft 12, and a carrier CR supporting first and second pinions $P_1$, $P_2$ is connected to the primary-side stationary sheave 23. A ring gear R of the planetary gear 50 is connected to the reverse brake $B_1$, which forms a reverse drive-purposed friction engagement element. The direct clutch $C_1$ is disposed between the carrier CR and the ring gear R.

A large gear 51 and a small gear 52 are fixed to the counter shaft 7. The large gear 51 is meshed with a gear 53 fixed to the secondary shaft 27. The small gear 52 is meshed with a gear 55 of the differential device 9. As for the differential device 9, rotation of a differential gear 56 supported on a differential case 66 having the gear 55 is transferred to right and left-side axles 60, 61 via right and left-side gears 57, 59.

Figure 2:
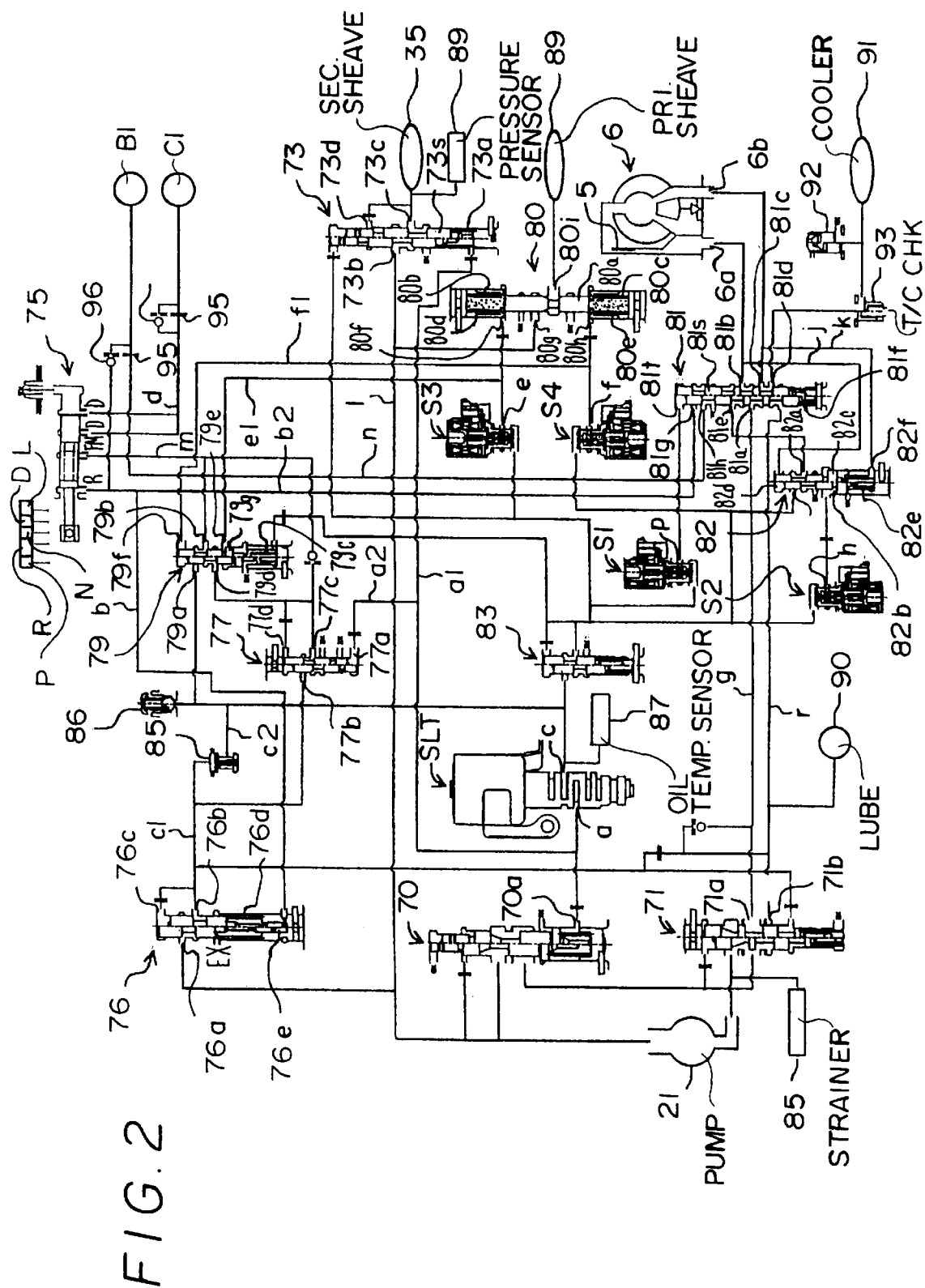
FIG. 2 is a diagram illustrating a hydraulic circuit of the transmission shown in FIG. 1.

Now, a hydraulic circuit of the continuously variable transmission will be described with reference to FIG. 2. FIG. 2 shows the oil pump 21, a primary regulator valve (first pressure regulating means) 70, a secondary regulator valve 71, a line pressure controlling linear solenoid valve SLT, a secondary sheave control valve (first pressure regulating means) 73, and a manual shift valve 75 that is changed by a driving person (driver) operating a shift lever or the like.

FIG. 2 further shows a clutch modulator valve 76 that generates a generally-termed clutch (modulator) pressure (working pressure, or range pressure) to be supplied to hydraulic servos C1, B1 for the direct clutch $C_1$ and the reverse brake $B_1$, a control valve 77 (second pressure regulating means) that generates a control pressure to be supplied to the aforementioned hydraulic servos at the time of switching a clutch or brake, and a relay (changeover) valve 79 that changes the clutch pressure and the control pressure mentioned above. The control valve and the relay valve mainly at the time of pulling the vehicle into, for example, a garage, and getting the vehicle out therefrom. Therefore, the control valve 77 and the relay valve 79 will hereinafter be referred to as "garage shift control valve" and "garage shift valve", respectively.

Further shown in FIG. 2 are a ratio control valve (control valve) 80, a lockup relay valve 81, a lockup control valve 82, and a solenoid modulator valve 83. A solenoid valve S1 for switching the lockup relay valve 81 is of a normally closed type, and controls the oil pressure in an on-off (supply-release) fashion. A solenoid valve S2 for controlling the lockup relay valve 81 is of a normally closed type, and regulates the oil pressure through a duty control. A (first) solenoid valve S3 for operating the ratio control valve 80 to a downshift side is of the normally closed type, and performs a duty control. A (second) solenoid valve S4 for operating the ratio control valve 80 to the upshift side is also of the normally closed type, and performs a duty control.

FIG. 2 further shows a strainer 85, a relief valve 86, an oil temperature sensor 87, a pressure sensor 89, a lubricant passage 90, a cooler 91, a cooler bypass valve 92, a check valve 93, the above-described primary-side hydraulic actuator 33, the secondary-side hydraulic actuator 35, the torque converter 6, and the lockup clutch 5. Other component parts shown in FIG. 2 are as indicated by well-known hydraulic symbols.

Figure 4:
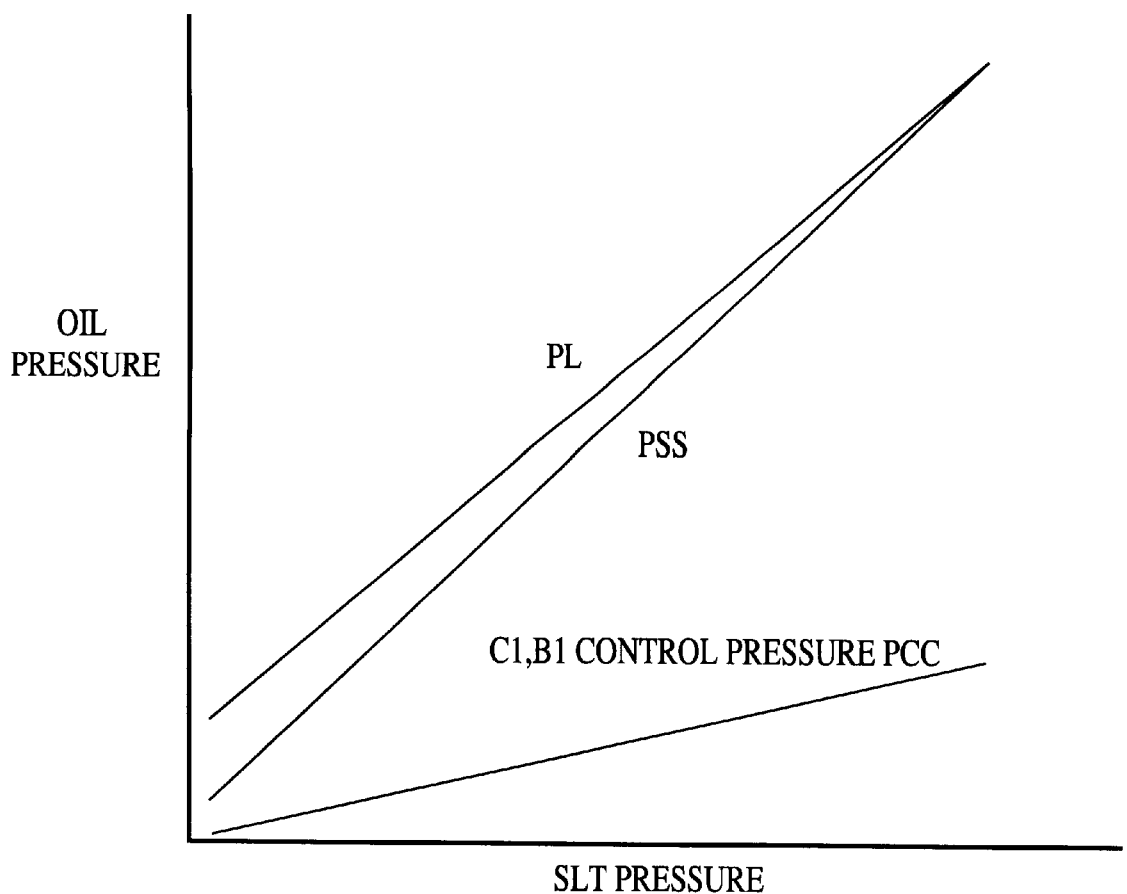
FIG. 4 is a graph indicating oil pressures based on the control oil pressure of a linear solenoid valve.

Operation based on the above-described construction will be described. Rotation of the oil pump 21 based on engine revolution generates a predetermined oil pressure. As indicated in FIG. 4, the oil pressure is regulated to the line pressure PL as the primary regulator valve 70 is controlled based on the SLT (control) pressure from the linear solenoid valve SLT controlled by a signal from the control unit that is calculated based on the pulley ratio and the degree of throttle opening (i.e., the input torque). Furthermore, a secondary pressure (Psec) is regulated. Furthermore, a signal oil pressure (SLT pressure) from an output port a of the linear solenoid valve SLT is supplied to a control oil chamber 73a of the secondary sheave control valve 73 via an oil passage a1. The valve 73 regulates the line pressure inputted to a port 73b to a secondary sheave pressure PSS, and outputs it to a port 73c, and supplies the pressure to the secondary-side hydraulic actuator 35.

The signal oil pressure (SLT pressure) of the linear solenoid valve SLT is supplied to a control oil chamber 77a of the garage shift control valve 77 via an oil passage a2. The control valve 77 regulates the clutch pressure inputted to a port 77b, and outputs the regulated pressure from a port 77c.

Figure 5:
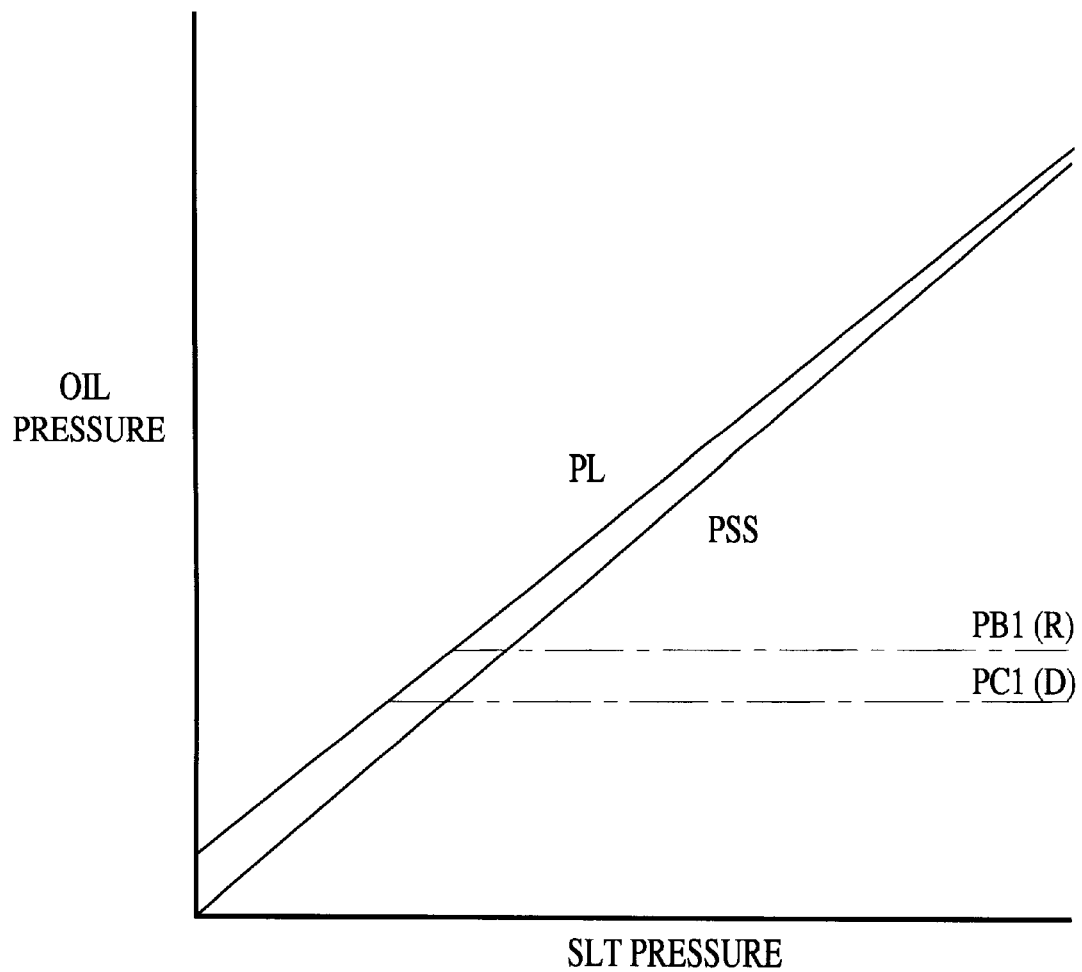
FIG. 5 is a graph indicating clutch pressures based on the control oil pressure of the linear solenoid valve.

The clutch modulator valve 76 receives the line pressure PL at a port 76a, and outputs the pressure from a port 76b. Furthermore, an output pressure (clutch pressure) from the aforementioned output port is inputted to a control oil chamber 76c of the valve 76. A spool is urged toward the aforementioned control oil chamber by a spring 76d. The oil pressure from a reverse port R of the manual shift valve 75 is supplied via an oil passage b to another control oil chamber 76e connected to the control oil chamber 76c via a small-diameter plug. Therefore, as indicated in FIG. 5, when the line pressure PL is low, the feedback pressure acting in the control oil chamber 76c does not overcome the pre-load of the spring 76d, and the clutch modulator valve 76 assumes a position shown by a left-side half illustration, and outputs a clutch pressure substantially equal to the line pressure. If the line pressure PL becomes higher, the feedback pressure becomes correspondingly high. When the feedback pressure overcomes the pre-load of the spring 76d, substantially constant clutch pressures PB1, PC1 are outputted due to the balance between the spring 76d and the feedback pressure in the control oil chamber 76c.

If the manual shift valve 75 is at the R range, the oil pressure from the reverse port R acts in the lower-end control oil chamber 76e, and adds to the spool raising force, so that the clutch pressure from the output port 76b becomes a predetermined amount higher than a D range pressure that occurs when no oil pressure acts in the control oil chamber 76e. Therefore, as can be seen from FIG. 5, the clutch pressure PB1 of the reverse range (R) that acts on the hydraulic servo B1 is a predetermined amount higher than the clutch pressure PC1 of the forward range (D) that acts on the hydraulic servo C1, so that a clutch (brake) engaging force is set so as to correspond to the output torque.

The operation of the continuously variable transmission will next be described with reference to an operation table shown in FIG. 3. When the parking range P, the reverse range R or the neutral range N is selected, the four solenoid valves S1 to S4 are all off and in a released state. The clutch pressure from the output port 76b of the clutch modulator valve 76 is supplied to an input (supply) port PM of the manual shift valve 75 via an oil passage c1, the strainer 85 and an oil passage c2 and also via ports 79a, 79b of the garage shift valve 79, which is at the position shown by the right-side half illustration. The clutch pressure of the oil passage c2 is inputted to the input port c of the linear solenoid valve SLT, and is also inputted to the solenoid modulator valve 83. The solenoid modulator valve 83 reduces the clutch pressure by a predetermined amount, and supplies the reduced pressure to the control oil chamber 79c of the garage shift valve 79.

When the drive range D is selected, the manual shift valve 75 connects an input port PM and a drive port D in communication, so that the clutch pressure is supplied to the hydraulic servo C1 so as to engage the direct clutch $C_1$. During this state, rotation of the engine output shaft 10 is transferred to the primary pulley 26 via the torque converter 6, the input shaft 12 and the planetary gear 50 locked up by the direct clutch $C_1$, and is further transferred to the secondary shaft 27 via the belt-type continuously variable transmission apparatus 2 that is suitably shifted. Rotation is further transferred to the right and left-side axles 60, 61 via the counter gears 51, 52 and the differential device 9.

The torque of the engine output shaft 10 is transferred to the input shaft 12 via the torque converter 6. In particular, at the time of starting the vehicle, rotation is shifted in speed by the torque converter 6 so as to increase the torque ratio, so that increased torque is transferred to the input shaft 12 and therefore the vehicle smoothly starts. The torque converter 6 is equipped with the lockup clutch 5. During a steady run of the vehicle at or above a predetermined speed, the lockup clutch 5 is engaged to interlock the engine output shaft 10 and the input shaft 12, thereby reducing the loss caused by oil currents within the torque converter 6. Furthermore, until the lockup clutch 5 becomes completely engaged, a slip control is performed based on the output pressure through the duty control of the solenoid valve S2 described below so that the difference between the input-side rotation and the output-side rotation of the lockup clutch 5 reaches a predetermined value.

Figure 6:
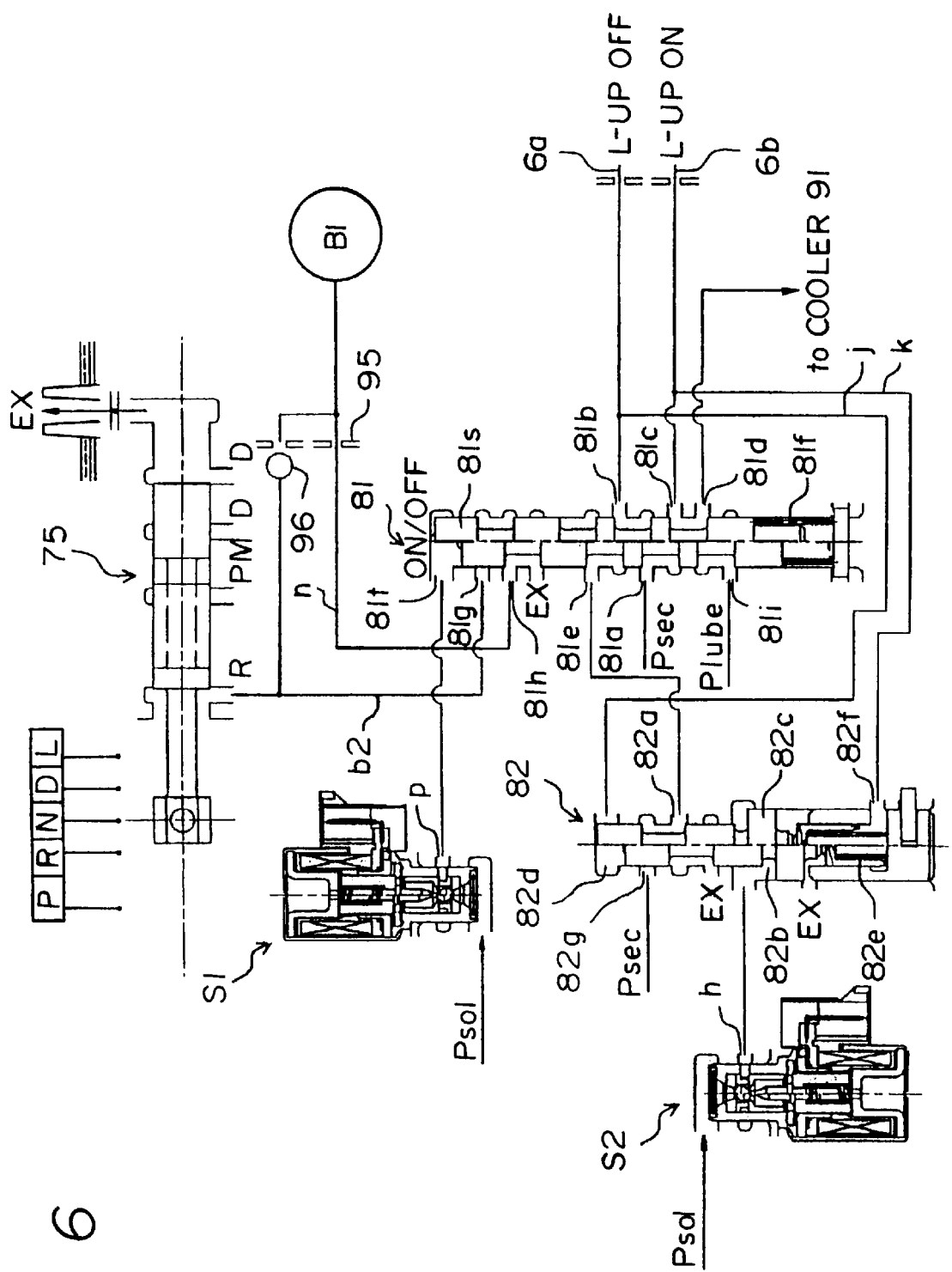
FIG. 6 is an enlarged diagram of a hydraulic circuit related to a reverse inhibiting portion.

That is, as illustrated in detail in FIG. 6, when it is determined based on the position sensor that the manual shift valve 75 is at the D range, an amount of operation of the accelerator and the input rotation speed from the input rotation speed sensor are read from a map, and a lockup OFF signal or a lockup ON signal is outputted from the control unit to the solenoid valve S1. If the solenoid valve S1 outputs a lockup OFF signal pressure (release) from the output port p, the lockup relay valve 81 is at the position shown by the right-side half illustration due to the spring force of the spring 81f. During this state, the secondary pressure (Psec) from the output port 71a of the secondary regulator valve 71 is supplied to the torque converter 6 via a lockup OFF port 6a via an oil passage g, and ports 81a, 81b of the lockup relay valve 81, and is led from a lockup ON port 6b to the cooler 91 via ports 81c, 81d of the relay valve 81. Therefore, the lockup clutch 5 is held in a disengaged state.

In contrast, when the solenoid valve S1, upon receiving the lockup ON signal from the control unit, outputs a signal pressure (supply), the signal pressure is supplied to the control oil chamber 81t, so that the lockup relay valve 81 is switched to a position shown by the left-side half illustration. During this state, the secondary pressure from the oil passage g is supplied to the torque converter 6 through the lockup ON port 6b, via the port 81a and the port 81c of the lockup relay valve 81, and is led from the lockup OFF port 6a to the port 82a of the lockup control valve 82 via the ports 81b, 81e of the lockup relay valve 81, and is discharged from a drain port EX. Therefore, the lockup clutch 5 is held in an engaged state.

Then, for the slip operation of the lockup clutch 5, the input-side and output-side rotation speeds of the lockup clutch 5, that is, the signal from the engine revolution sensor and the signal from the input rotation speed sensor, are inputted to the control unit, and a signal such that the difference therebetween becomes equal to a predetermined value is outputted. On the basis of the signals, the solenoid valve S2 is duty-controlled, so that a predetermined control oil pressure is outputted from the output port h and the control oil pressure acts in an intermediate control oil chamber 82b of the lockup control valve 82. The lockup control valve 82 has an upper control oil chamber 82d that operates on the upper end of the spool 82c, and a lower control oil chamber 82f that operates on a lower end of the spool together with the spring 82e. The oil pressure from the lockup OFF port 6a acts in the upper control oil chamber 82d via an oil passage j. The oil pressure from the lockup ON port 6b acts in the lower control oil chamber 82f via an oil passage k. Thus, the lockup clutch control oil pressures act on the spool 82c in a differential pressure state.

When the control oil pressure provided by the duty control acts in the control oil chamber 82b of the lockup control valve 82 in the differential pressure acting state, the spool 82c is moved downward in accordance with the control oil pressure so that the output port 82a communicates with the input port 82g and the drain port EX at a predetermined proportion. Therefore, the oil pressure from the lockup OFF-side port 6a reaches a predetermined pressure, so that the ON-side oil chamber and the OFF-side oil chamber of the torque converter 6 become balanced and the lockup clutch 5 assumes a predetermined slip state.

A reverse speed stage prohibiting (reverse inhibiting) mechanism will be described with reference to FIG. 6. The lockup relay valve 81 has reverse inhibiting ports 81g, 81h and the drain port EX in addition to the ports 81a, 81b, 81c, 81d, 81e for the lockup clutch control. The port 81i of the lockup relay valve 81 is supplied with a lubricant from a lubrication port 71b (see FIG. 2) of the secondary regulator valve 71 via an oil passage r. When the lockup relay valve 81 is at the lockup ON position (position shown by the left-side half illustration), the port 81i and the port 81d are connected in communication so as to supply the lubricant to the lubricant cooler 91. This is a measure adopted because although the oil from the torque converter 6 is supplied to the cooler 91 via the oil passage 81*d* when the lockup relay valve 81 is at the lockup OFF position (position shown by the right-side half illustration), the oil from the torque converter is not supplied to the cooler 91 when the lockup relay valve 81 is at the lockup ON position.

When the vehicle is steadily running at or above a predetermined speed at the drive range D, the lockup clutch 5 is in the engaged state, and the lockup relay valve 81 is held at the ON position (position shown by the left-side half illustration) due to the ON signal pressure (supply) of the solenoid valve S1. If in this state, a driver operates the shift lever to the reverse range R by mistake, so that the input port PM and the reverse port R of the manual shift valve 75 are connected in communication and the clutch pressure is supplied from the input port PM to the reverse port R, the clutch pressure is blocked at the port 81*g* of the lockup relay valve 81 via the oil passage b2, and the reverse brake hydraulic servo B1 is connected in communication to the drain port EX via the oil passage n and the port 81*h*. Therefore, while the vehicle is steadily running at or above the predetermined speed with the lockup clutch 5 being on, an operation of the shift lever to the reverse range will not cause engagement of the reverse brake B1, and therefore will not cause a reverse drive state (reverse inhibition). During this reverse inhibition state, the ON state (position shown by the left-side half illustration) of the lockup relay valve 81 is maintained. Therefore, a time lag associated with the switching of valves will not occur, unlike the conventional art employing a dedicated reverse inhibiting (reverse drive prohibiting) valve.

If the vehicle is decelerated to or below a predetermined speed to assume a stopped state, the solenoid valve S1 is set to the OFF (open) state, and the lockup relay valve 81 is set to the OFF position (position shown by the right-side half illustration). During this state, the secondary pressure is supplied from the port 81*a* to the lockup OFF port 6*a* of the torque converter 6 via the port 81*b*, and is led to the cooler 91 via the lockup ON port 6*b*, and the ports 81*c*, 81*d*. Thus, the lockup clutch 5 is in the disengaged state. When the vehicle is in the substantially stopped state where the vehicle speed is less than or equal to the predetermined speed, the ports 81*g*, 81*h* of the lockup relay valve 81 are connected in communication. If in this state, the manual shift valve 75 is operated to the reverse position R to connect the input port PM and the reverse port R, the clutch pressure (or the control pressure) is supplied to the hydraulic servo B1 via the oil passage b2, the ports 81*g*, 81*h* and the oil passage n. Therefore, the reverse brake B1 is engaged to achieve the reverse speed stage.

Furthermore, during the operation of the reverse inhibition, that is, while the vehicle is running forward at or above the predetermined speed, a case is conceivable in which a driver operates the shift lever to the reverse range by mistake and, while the shift lever is left at the reverse range, the lockup clutch 5-releasing signal is outputted from the control unit due to, for example, a deceleration (acceleration) or the like. In such a case, the solenoid valve S1 continues outputting the signal pressure from the output port p based on the ON signal from the control unit, and the lockup relay valve 81 is held at the ON position (position shown by the left-side half illustration), and the port 81*g* remains shut down. Thus, the reverse inhibited state is continued. During this state, the solenoid valve S2 is in the OFF state, that is, in the open (zero pressure) state where the duty ratio is 0 [%], and the lockup control valve 82 is at the position shown by the right-side half illustration due to the elastic force of the spring 82*e*, so that the port 82*g*, 82*a* are in a full communication state. Therefore, the secondary pressure (Psec) is led to the port 81*e* of the lockup relay valve 81 via the ports 82*g*, 82*a*, and is supplied to the lockup OFF port 6*a* via the port 81*b* of the lockup relay valve 81, which is at the ON position. During this state, the torque converter 6 is supplied with the secondary pressure (Psec) at the ON side via the port 6*b* and at the OFF side via the port 6*a*, so that pressure difference between the two chambers disappears and the lockup clutch 5 is held in the released state.

When at the drive range D, the lockup relay valve 81 is switched to the ON position due to the switching of the solenoid valve S1 to the ON position and the secondary pressure (Psec) is supplied to the lockup ON port 6*b* via the ports 81*a*, 81*c*, the oil pressure from the lockup OFF port 6*a* is led to the port 82*a* of the lockup control valve 82 via the ports 81*a*, 81*c*. In that case, the duty ratio of the solenoid valve S2 smoothly increases from the OFF state. Therefore, from a state where the lockup control valve 82 is at the position shown by the right-side half illustration and the secondary pressure is supplied at the port 82*a* and the port 82*g*, that is, from a state where the oil pressure equal to the discharge pressure from the lockup OFF port 6*a* is supplied so as to eliminate the pressure difference between the two oil chambers of the torque converter 6 and release the lockup clutch 5, the lockup control valve 82 supplies the control oil chamber 82*b* with the signal pressure that gradually increases with increases in the duty ratio of the solenoid valve S2, so that the spool 82*c* is moved downward and the port 82*a* gradually increases the communication proportion between the secondary pressure supply port 82*g* and the drain port EX to the drain port side. Therefore, the lockup clutch 5 is smoothly engaged, and the lockup control valve 82 is set to the position shown by the left-side half illustration, so that the port 82*a* is connected in full communication to the drain port EX and therefore the lockup clutch 5 is completely engaged.

That is, the lockup control valve 82 has the functions of performing the slip control of the lockup clutch 5 as described above, and of achieving smooth engagement without a shift shock at the time of engaging the clutch, and of releasing the lockup clutch 5 during the reverse inhibition associated with addition of the reverse inhibiting function to the lockup relay valve 81.

Next, a mechanism for changing the oil pressure supplied to a hydraulic servo for a vehicle-starting friction engagement element will be described with reference to FIG. 7. The ratio control valve 80 has control oil chambers 80*s*, 80*t* at two ends of a spool 80*a*. Springs 80*b*, 80*c* are disposed in a compressed state in the two control oil chambers, respectively. Washers 80*d*, 80*e* are disposed between the springs and the two ends of the spool. Each washer has a hollow cylindrical portion and a bottom wall portion. The cylindrical portion of each washer is slidably guided by a side wall of the control oil chamber 80*s*, 80*t*, and the bottom wall portion is contactable to an end surface of the control oil chamber and an end of the spool.

The ratio control valve 80 further has a spool 80*a* that has in its central portion a communicating portion formed by an annular recess, a port 80*f* that communicates with the output port e of the downshift solenoid valve S3 via an oil passage e2 and an orifice 95 and that is opened to one chamber 80*s* of the control oil chambers, a port 80*h* that communicates with the output port f of the upshift solenoid valve S4 via an oil passage f2 and an orifice 95 and that is opened to the other control oil chamber 80*t*, an input (supply) port 80*g* supplied with the line pressure PL from a line pressure oil passage 1, an output port 80*i* that communicates with the primary-side hydraulic actuator 33 (more specifically, to the control oil chambers 41, 42 thereof), and two drain ports EX. This construction is described in detail in our earlier filed Japanese Patent Application Nos. HEI 11-210485 and HEI 11-375789.

If the solenoid valves S3, S4 are OFF and the output ports e, f are in the open state (zero pressure), the control pressure does not act in the control oil chambers 80*s*, 80*t* of the ratio control valve 80, and the elastic forces of the springs 80*b*, 80*e* act on the two ends of the spool 80*a* via the washers 80*d*, 80*e* so that the bottom wall portions of the washers contact the end surfaces of the control oil chambers. Therefore, the spool is positioned and held at a neutral position indicated in the drawing. During this state, the supply port 80*g* and the output port 80*i* are both in the shut-down state, and the primary-side hydraulic actuator 33 is held in a predetermined state without any oil pressure being let in or out. Thus, the belt-type continuously variable transmission apparatus 2 is held at a predetermined speed ratio.

A solenoid modulator pressure from the solenoid modulator valve 83 is inputted to input ports o, p of the downshift solenoid valve S3 and the upshift solenoid valve S4. The solenoid valves S3, S4 are duty-controlled based on predetermined electric signals from the control unit, so as to output predetermined signal pressures from the ports e, f.

If when the drive range D is selected, the control unit determines a downshift based on signals from sensors, the solenoid valve S3 is duty-controlled in accordance with the determination, so as to output a predetermined signal pressure from the output port e. The predetermined signal pressure from the output port e acts on the port 80*f* of the ratio control valve 80, which is at the neutral position, via the oil passage e2 and the orifice 95. In response, the spool 80*a* is moved downward overcoming the force from the spring 80*c*, in accordance with the signal pressure acting in the control oil chamber 80*s*.

Therefore, the output port 80*i* communicates with the drain port EX at a proportion corresponding to the predetermined signal pressure, and the oil pressure of the primary-side hydraulic actuator 33 is drained at a predetermined rate. The secondary-side hydraulic actuator 35 is supplied with a predetermined secondary sheave pressure PSS. Hence, the belt-type continuously variable transmission apparatus 2 shifts speed in such a direction as to reduce the effective diameter of the primary pulley 26, that is, toward the under-drive side (downshift).

If the control unit determines an upshift when the drive range D has been selected, the solenoid valve S4 is duty-controlled in accordance with the determination, so that a predetermined signal pressure is outputted from the output port f. The signal pressure is supplied to the port 80*b* of the ratio control valve 80 via the oil passage f2 and the orifice 95.

On the basis of the aforementioned signal pressure of the control oil chamber 80*t*, the ratio control valve 80 moves the spool 80*a* upward overcoming the force from the spring 80*b*, so as to connect the supply port 80*g* and the output port 80*i* in communication at a predetermined proportion. Therefore, the line pressure PL supplied from the oil passage 1 to the supply port 80*g* is regulated to an oil pressure corresponding to a predetermined signal pressure based on the aforementioned duty ratio. The regulated oil pressure is supplied to the primary-side hydraulic actuator 33 from the output port 80*i*. As for the secondary-side hydraulic actuator 35, the predetermined secondary sheave pressure PSS corresponding to the input torque is applied by the secondary sheave control valve 73, so that a belt clamping force is maintained, as mentioned above. When the aforementioned oil pressure is supplied to the double-piston type primary-side hydraulic actuator 33, the belt-type continuously variable transmission apparatus 2 shifts speed in such a direction as to increase the effective diameter of the primary pulley 26, that is, toward the over-drive side (upshift).

When the manual shift valve 75 is switched from the neutral position N to the drive position D or the reverse position R by operating the shift lever, both the downshift solenoid valve S3 and the upshift solenoid valve S4 are switched to the ON state, that is, a full supply state with the duty ratio being 100 [%], upon a signal from the control unit based on the position sensor. As a result, the control oil chambers 80*s*, 80*t* of the ratio control valve 80 are supplied with equal modulator pressures via the two input ports 80*f*, 80*h*, so that the urging forces acting on the opposite sides of the spool 80*a* become equal. Thus, the ratio control valve 80 is held at the neutral position as in the case where the solenoid valves S3, S4 are in the OFF state. Therefore, the belt-type continuously variable transmission apparatus 2 is held at a predetermined speed ratio. In general, a downshift operation is performed in the drive range D before the neutral position, that is, a stopped state, is reached, and therefore, the belt-type continuously variable transmission apparatus 2 is in an undermost-drive state. It should be noted herein that when the shift position is at the reverse range R, the ratio control valve 80 is not operated, and the belt-type continuously variable transmission apparatus 2 is held at a predetermined position (generally at the undermost-drive position). In this case, the working pressure is supplied from the two solenoid valves S3, S4 to the garage shift valve 79, and switches the garage shift valve 79 so as to supply the control pressure from the garage shift control valve 77 to the manual shift valve 75.

The garage shift valve 79 has a control oil chamber 79*f* that is partially defined by an end (upper end) of a spool 79*g*, and a compressed spring 79*c* disposed on another end (lower end) of the spool 79*g*, and has a control oil chamber 79*e* that is defined in an intermediate stage for urging the spool 79*g* downward based on area difference. The garage shift valve 79 further has an input (supply) port 79*a* that is supplied with crutch modulator pressures (working pressure, range pressure) PB1, PC1 from the clutch modulator valve 76, an output port 79*b* connected in communication to the input port PM of the manual shift valve 75, and a control pressure input port 79*d* connected in communication to the output port 77*c* of the garage shift control valve 77. Furthermore, a control oil chamber 79*h* in which the compressed spring 79*c* is disposed is connected for receiving a solenoid modulator pressure PSM from the solenoid modulator valve 83 which is supplied to the input ports p, o of the solenoid valves S3, S4.

The garage shift control valve 77 has a control oil chamber (feedback chamber) 77*d* at an end (upper end) of a spool 77*s*, and has at another end of the spool 77*s* a control oil chamber 77*a* that generates a third predetermined pressing force on the spool 77*s* in one direction upon receiving a signal pressure PSLT from the linear solenoid valve SLT on a predetermined pressure-receiving area. The garage shift control valve 77 further has an input (supply) port 77*b* that is supplied with the aforementioned clutch modulator pressure (working pressure) PB1, PC1, a port 77*c* connected to in communication to the control pressure input port 79*d* of the garage shift valve 79, and a drain port EX. The control pressure from the port 77c acts on a predetermined pressure-receiving area of the control oil chamber (feedback chamber) 77d as a feedback pressure, and therefore produces a fourth predetermined pressing force on the spool 77s in a direction other than the aforementioned direction. Thus, the control pressure is controlled by the third predetermined pressing force and the fourth predetermined pressing force. The oil pressure from the port 77c is supplied to the input port PM of the manual shift valve 75 via an oil passage s and a check valve 96. The third predetermined pressing force and the fourth predetermined pressing force can be set depending on the predetermined pressure-receiving areas. That is, by setting the ratio between the pressure-receiving areas, the gain of the garage shift control valve 77 (second pressure regulating means) can be set. The "gain" is a proportional value based on the signal pressure and the output pressure, for example, the gradient of the signal pressure in a mathematical expression that gives the output pressure.

During this state, that is, at the time of switching the manual shift valve 75 from the neutral position N to the drive position D or the reverse position R, that is, when the vehicle is to be started forward or rearward, the full supply state signal pressures from the solenoid valves S3, S4 are supplied to control oil chambers 79e, 79f of the garage shift valve 79 via oil passages e1, f1. Therefore, due to the oil pressure in the control oil chamber 79f that acts on the upper end of the spool 79g of the garage shift valve 79 and the oil pressure in the control oil chamber 79e that acts downward based on the area difference in the intermediate stage of the spool 79g, the spool 79g is moved to the position shown by the left-side half illustration (control position) overcoming the solenoid modulator pressure (initial pressure) in the control oil chamber 79h and the elastic force of the spring 79c in the control oil chamber 79h.

Thus, the valve state is switched from the state where the clutch pressure (direct pressure) PB1, PC1 from the input port 79a is supplied to the output port 79b to the state where the control pressure input port 79d and the output port 79b are connected in communication. Therefore, the control pressure PCC from the garage shift control valve 77 is outputted from the output port 79b. As described above, the garage shift control valve 77 outputs from the output port 77c the control pressure PCC reduced from the clutch pressure by the signal pressure PSLT from the linear solenoid valve SLT as indicated in FIG. 4. The control pressure is supplied to the input port PM of the manual shift valve 75 via the garage shift valve 79 switched as described above and via an oil passage m.

At the time of switching from the neutral range N to the drive range D (N→D), the control pressure from the input port PM is supplied from the port D of the manual shift valve 75 to the direct clutch hydraulic servo C1 via the oil passage d and the orifice 95. In this case, the control pressure is controlled so as to smoothly rise by the signal pressure supplied from the linear solenoid valve SLT to the control oil chamber 77a of the garage shift control valve 77. Therefore, the direct (input) clutch $C_1$ is smoothly engaged so as not to cause a shift shock, so that the forward-reverse drive switching device 3 assumes a forward drive state in which the input shaft 12 and the primary pulley 26 are interlocked. It should be noted herein that when the shift lever is shifted to the low range L, the input port PM of the manual shift valve 75 is connected to the right-side end port D as well, so that the control pressure PCC is supplied to the clutch hydraulic servo C1.

At the time of switching from the neutral range N to the reverse range R (N→R), the control pressure from the input port PM is supplied from the port R of the manual shift valve 75 to the reverse brake hydraulic servo B1 via the oil passage b2, the ports 81g, 81h of the lockup relay valve 81, the oil passage n, and the orifice 95. The control pressure smoothly rises due to the signal pressure from the linear solenoid valve SLT as in the above-described case. Therefore, the reverse brake $B_1$ is smoothly engaged so as not to cause a shift shock, so that the ring gear R of the forward-reverse drive switching device 3 is fixed. Hence, rotation of the input shaft 12 is transferred to the primary pulley 26 via the double-pinion planetary gear 50 as reduced-speed reverse rotation.

When the engagement of the direct clutch $C_1$ or the reverse brake $B_1$ is completed upon elapse of a predetermined time following the detection by the position sensor or detection of achievement of a predetermined engaged state based on the rotation sensor, the full supply state of the solenoid valves S3, S4 is removed upon a signal from the control unit. Due to this state, that is, the OFF state (release) of at least one the two solenoid valves, the garage shift valve 79 is switched to the position shown by the right-side half illustration (direct position) by the solenoid initial pressure of the control oil chamber 79h and the elastic force of the spring 79c. During this state, the clutch pressure from the clutch modulator valve 76 is supplied to the input port PM of the manual shift valve 75 via the output port 76b, the oil passage c1, the strainer 85, the oil passage c2, the ports 79a, 79b, and the oil passage m. Then, due to the range D or R of the garage shift valve 79, the clutch pressure (direct pressure) is supplied to the hydraulic servo C1 or B1 so that the direct clutch $C_1$ or the reverse brake $B_1$ is reliably held in the engaged state.

The check valves 96 disposed in the oil passages d, m connected to the hydraulic servos C1, B1 are provided for quickly draining oil pressure from the hydraulic servos without a delay by bypassing the orifices 95 when the direct clutch $C_1$ or the reverse brake $B_1$ is to be released.

Figure 8:
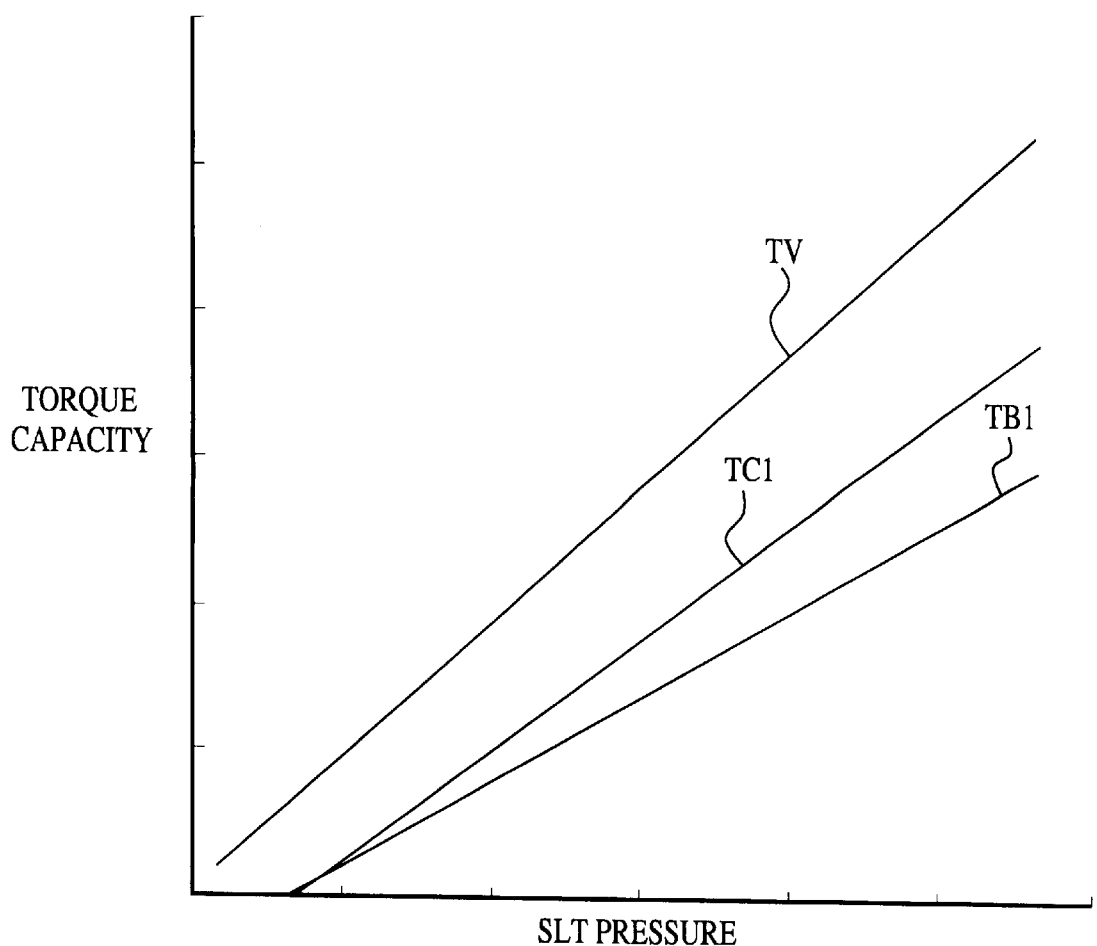
FIG. 8 is a graph indicating the torque capacities of the continuously variable transmission apparatus and friction engagement elements based on the control oil pressure of a linear solenoid valve at the time of starting the vehicle.
Figure 9:
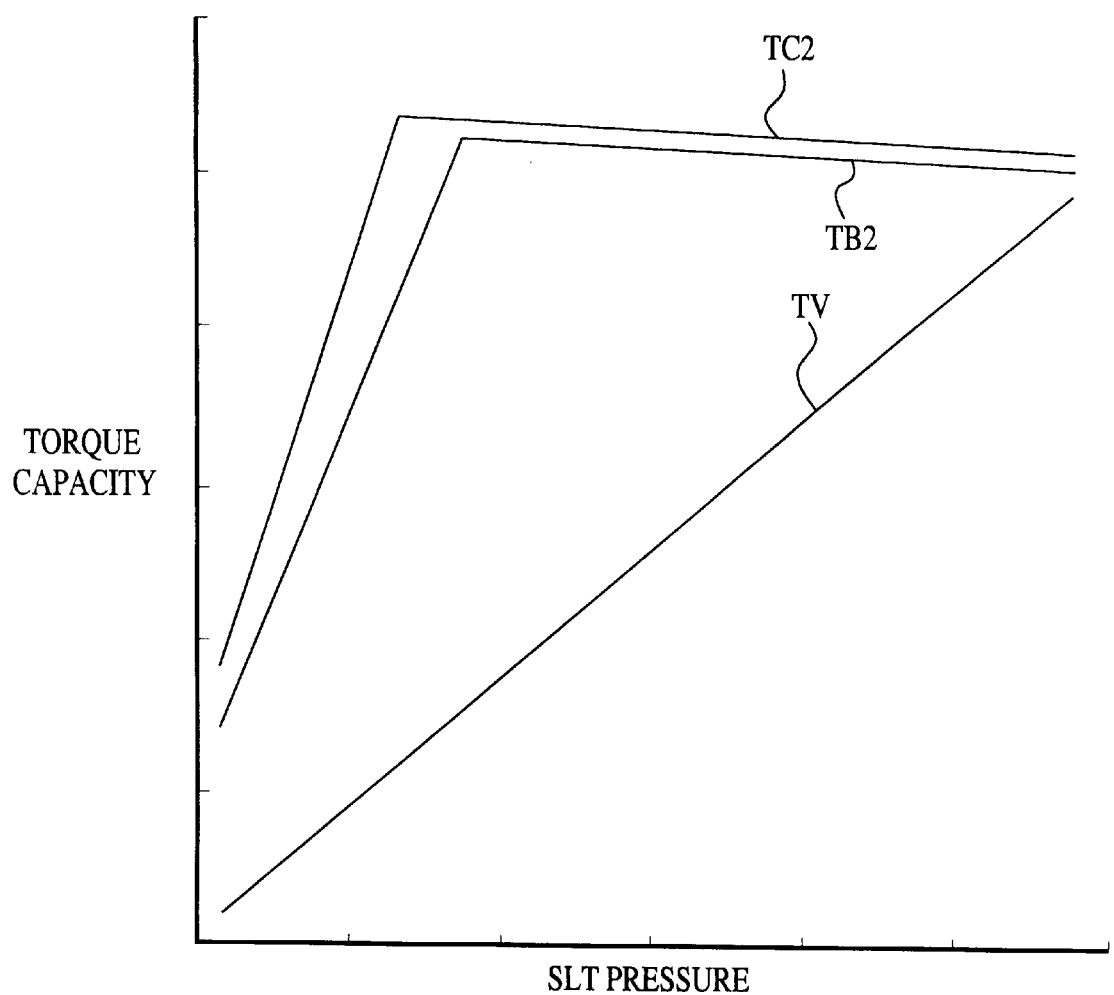
FIG. 9 is a graph indicating the torque capacities of the continuously variable transmission apparatus and friction engagement elements based on the control oil pressure of a linear solenoid valve during a run of the vehicle.

Next, on the basis of the construction and operation described above, the torque capacities of the belt and the friction engagement elements of the continuously variable transmission apparatus during a vehicle start (direct control based on the linear solenoid valve) or a vehicle run will be described with reference to FIGS. 8 and 9. The torque capacity TV of the belt of the continuously variable transmission apparatus is proportional to the clamping force of the secondary pulley 31 on the belt 32 while the torque capacity of the belt is also affected by the pulley taper angle, the pulley-belt contact area, the friction coefficient, the chamber area, etc. That is, the torque capacity TV of the belt is determined by the oil pressure of the secondary-side hydraulic actuator 35 with respect to the secondary pulley 31. The torque capacity TC1, TB1 of a friction engagement element is proportional to the force acting on the clutch or brake plate while the torque capacity is also affected by the clutch or brake effective radius, the number of friction plate members, the friction coefficient, the chamber area, etc. That is, the friction engagement element torque capacity TC1, TB1 is determined by the oil pressure of the friction engagement element hydraulic servo C1, B1. In FIGS. 8 and 9, lower and upper limits of the SLT pressure achieve a minimum pressure and a maximum pressure of the secondary sheave, and the SLT pressure realizes the torque capacity needed by the continuously variable transmission 1 in order to perform the function of a transmission.

When the manual shift valve 75 is switched from the neutral position N to the drive position D or the reverse position R to start the vehicle forward or rearward, the linear solenoid valve SLT is first controlled based on the input torque so that the SLT (control) pressure is supplied from the output port a to the control oil chamber 70a of the primary regulator valve 70, the control oil chamber 73a of the secondary sheave control valve 73, and the control oil chamber 77a of the garage shift control valve 77.

To start the vehicle, the primary regulator valve 70, on the basis of the SLT pressure of the control oil chamber 70a, supplies the line pressure that is gradually risen, to the secondary-side hydraulic actuator 35 via the input port 73b of the secondary sheave control valve 73. In this operation, the control oil chamber 73a generates a first predetermined pressing force on the spool 73s in one direction upon receiving the SLT pressure on a predetermined pressure-receiving area, and the feedback chamber 73d generates a second predetermined pressing force on the spool 73s in another direction upon receiving the line pressure on a predetermined pressure-receiving area. Therefore, on the basis of the ratio between the pressure-receiving areas (gain), the secondary sheave control valve 73 is controlled. As a result, a pressure regulating control is performed with respect to the movable sheave 30 so as to clamp the belt 32 so that the torque capacity TV of the belt gradually increases proportionally to the SLT pressure as indicated in FIG. 8. Furthermore, by setting the ratio (gain) between the pressure-receiving area of the control oil chamber 73a and the pressure-receiving area of the feedback chamber 73d, the setting of the pressure regulating control of the secondary sheave control valve 73 is suitably determined, that is, the torque capacity TV of the belt is suitably determined. That is, the clamping force of the movable sheave 30 on the belt 32 causes problems, such as breakage, reduced service life, etc., if the clamping force is excessively strong. If the clamping force is excessively weak, there arises the danger of a slip of the belt 32. However, since the linear solenoid valve SLT is controlled based on the degree of throttle opening, and the belt 32 is clamped in such a fashion that the torque capacity TV of the belt 32 gradually increases in accordance with the torque supplied from the engine via the engine output shaft 10 as described above, breakage or durability loss of the belt 32 can be prevented.

The clutch modulator valve 76, supplied with the line pressure that is gradually raised by the primary regulator valve 70, raises the working pressure gradually as described above. When a predetermined line pressure is reached, the clutch modulator valve 76 supplies an approximately constant working pressure to the input port 77b of the garage shift control valve 77. That is, the working pressure as an upper limit-cut input pressure is inputted to the garage shift control valve 77, and the control pressure for the garage shift control valve 77 can be used in a relatively broad range. Therefore, the controllability of the linear solenoid valve SLT can be improved, and the starting performance of the vehicle can be improved. If the oil pressure from the output port 76b of the clutch modulator valve 76 is inputted to the input port c of the linear solenoid valve SLT and a predetermined line pressure is reached, a substantially constant working pressure can be used as an initial pressure of the linear solenoid valve SLT. Therefore, high-precision control can be performed based on the stable oil pressure.

Then, the garage shift control valve 77 is controlled by the control oil chamber 77a supplied with the SLT pressure and the feedback chamber 77d to which the working pressure is fed back. The regulated working pressure is supplied to the direct clutch hydraulic servo C1 and the reverse brake hydraulic servo B1 (see FIG. 5). In this case, the pressure regulating control by the garage shift control valve 77 is set by setting the ratio (gain) between the pressure-receiving area of the control oil chamber 77a and the pressure-receiving area of the feedback chamber 77d. Therefore, the setting is made so that the torque capacity TC1 of the direct clutch $C_1$ and the torque capacity TB1 of the reverse brake $B_1$ become smaller than the torque capacity TV of the belt 32. As a result, the torque capacities TC1, TB1 of the direct clutch $C_1$ (at the time of the D range) or the reverse brake $B_1$ (at the time of the reverse range) becomes smaller than the torque capacity TV of the belt 32 without fail as indicated in FIG. 8. Therefore, the torque from the engine output shaft 10 is transferred to the belt 32 after being regulated by the direct clutch $C_1$ and the reverse brake $B_1$. That is, the torque controlled so as not to exceed the torque capacity TV of the belt 32 is transferred to the belt 32. Therefore, the slipping of the belt 32 can be prevented, and the vehicle can be smoothly started. Since the direct clutch $C_1$ and the reverse brake $B_1$ are controlled based on the input torque, the aforementioned setting may also be made so as to eliminate the creep state of the vehicle at the time of a stop of the vehicle.

When the vehicle is running, the line pressure is raised based on the input torque as described above, and the belt 32 is reliably clamped, and therefore the torque capacity TV of the belt 32 increases. Furthermore, the working pressure inputted to the input port 79d of the garage shift valve 79 is raised. The garage shift valve 79 is switched so as to input the working pressure via the input port 79a. Then, as indicated in FIG. 9, the direct clutch hydraulic servo C1 and the reverse brake hydraulic servo B1 are directly controlled by the working pressures PC1, PB1 so that the torque capacity TC2, TB2 of the direct clutch $C_1$ (at the time of the D range) or the reverse brake $B_1$ (at the time of the R range) becomes greater than the torque capacity TV of the belt 32, and gradually increases. If the line pressure becomes equal to or higher than a predetermined pressure, the clutch modulator valve 76 regulates the pressure to a substantially constant working pressure, and supplies the regulated working pressure to the garage shift valve 79. Therefore, the direct clutch hydraulic servo C1 is controlled by the constant pressure PC1, and the reverse brake hydraulic servo B1 is controlled by the constant pressure PB1 (see FIG. 5), so that the torque capacity TC2, TB2 of the direct clutch $C_1$ and the reverse brake $B_1$ is controlled to a constant level. Hence, it is possible to achieve a needed torque capacity without allowing breakage or durability loss of the direct clutch $C_1$ and the reverse brake $B_1$ due to an excessive pressure, and to maintain the engagement of the direct clutch $C_1$ and the reverse brake $B_1$ with high precision. Furthermore, during the running of the vehicle, the working pressure is set so that the torque capacity TC2, TB2 of the direct clutch $C_1$ and the reverse brake $B_1$ becomes greater than the torque capacity TV of the belt 32 as described above. Therefore, it is possible to transfer the torque from the input shaft 12 to the belt 32 without allowing a loss at the direct clutch $C_1$ or the reverse brake $B_1$. Thus, good torque transmission with improved reliability can be accomplished.

As is apparent from the above description, according to the invention, the direct clutch $C_1$ and the reverse brake $B_1$ and the secondary pulley 31 can be controlled by the only one linear solenoid valve SLT. Therefore, unlike the conventional art, it is possible to perform a control of raising the oil pressure based on the degree of throttle opening without providing linear solenoid valves dedicated to those elements. Hence, the accumulators and the like needed for the direct clutch $C_1$ and the reverse brake $B_1$ according to the conventional art can be eliminated. That is, it becomes possible to simplify the construction of the continuously variable transmission and reduce the size and cost thereof. Furthermore, when the solenoid valves S3, S4 are controlled to the ON state, that is, when the shift lever is shifted from the neutral position (N) to the drive (D) range or the reverse (R) range, the working pressure is supplied from the solenoid valves S3, S4 to the garage shift valve 79, so that the garage shift valve 79 can be operated. Therefore, a dedicated solenoid valve for operating the garage shift valve 79 can be eliminated. Hence, the construction of the continuously variable transmission can be further simplified, and the size and cost thereof can be reduced.

In the oil pressure control apparatus of the embodiment described above, the working pressure from the clutch modulator valve 76 is supplied to the solenoid valves S1 to S4 via the solenoid modulator valve 83. However, the solenoid modulator valve 83 is provided merely for making the working pressure stable, and may be omitted. The line pressure outputted by the primary regulator valve 70 is regulated by the secondary sheave control valve 73, and is supplied to the secondary-side hydraulic actuator 35. However, since the line pressure is generated based on the signal pressure of the linear solenoid valve SLT based on the input torque, it is also possible to supply the line pressure directly to the secondary-side hydraulic actuator 35 without providing the secondary sheave control valve 73.

Furthermore, in the oil pressure control apparatus of the embodiment described above, the secondary sheave control valve 73 and the garage shift control valve 77 are constructed and controlled so that the predetermined pressing forces from the control oil chamber and the feedback chamber act on the spool in opposite directions. However, the secondary sheave control valve 73 and the garage shift control valve 77 have, for example, a construction in which a spring for urging the spool in one direction is provided, and the oil pressures in the control oil chamber and the feedback chamber act on an opposite side of the spool in the same direction (direction opposite to the aforementioned one direction), so that the control valve is controlled by the elastic force of the spring and the pressing force produced by the two oil pressures.

Still further, although the foregoing embodiment is described in conjunction with the belt-type continuously variable transmission apparatus, the embodiment is not limited to this type of transmission apparatus, but may be applied to other continuously variable transmission apparatuses such as a toroidal type transmission apparatus and the like. The embodiment is applicable to any transmission apparatus as long as the torque capacities of friction engagement elements and a continuously variable transmission apparatus can be controlled.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

Figure 7:
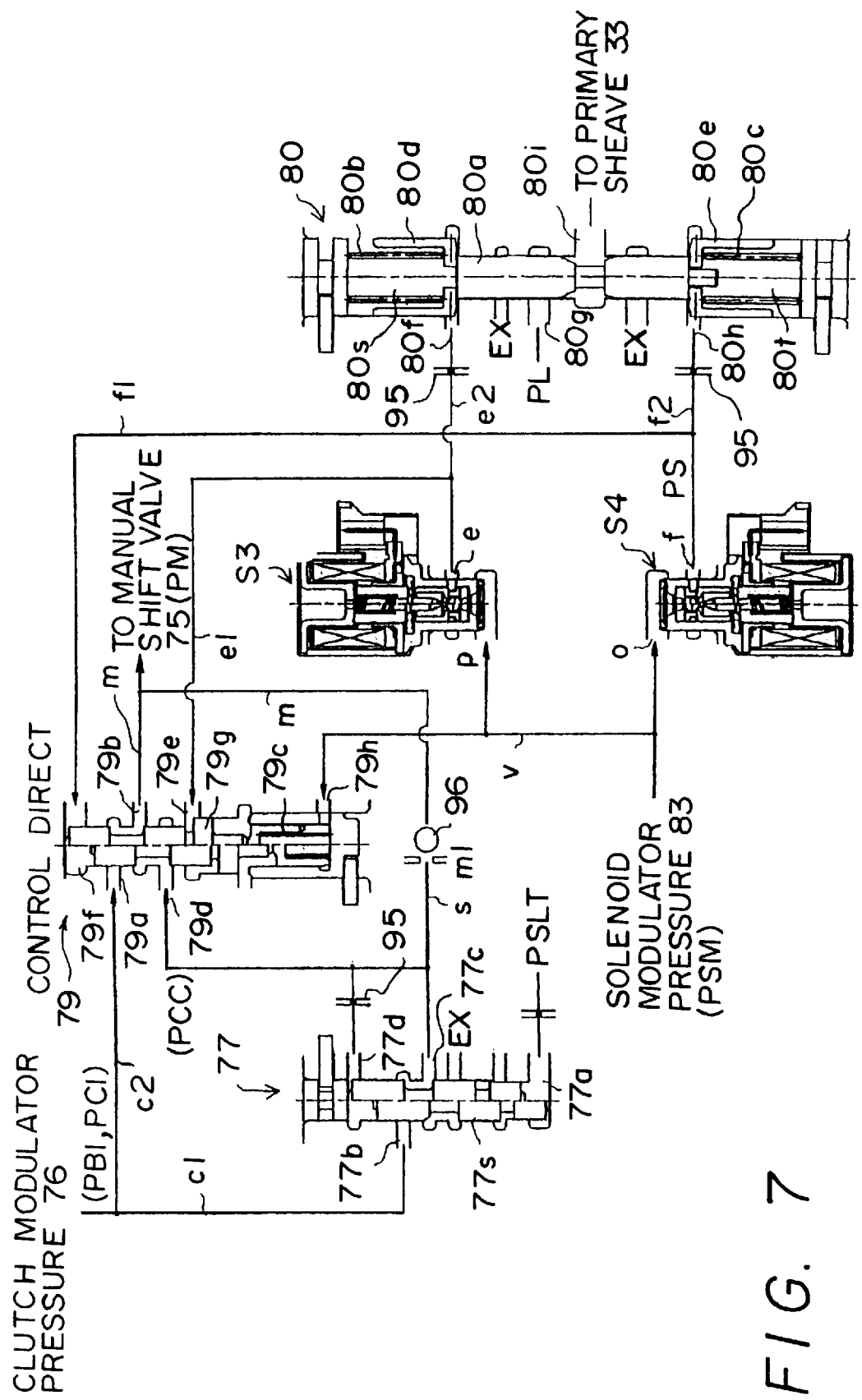
FIG. 7 is an enlarged diagram of portions of a hydraulic circuit in accordance with the invention.

FIG. 3
OPERATION TABLE
FIG. 4
OIL PRESSURE
  C1, B1 CONTROL PRESSURE PCC
SLT PRESSURE
FIG. 5
OIL PRESSURE
SLT PRESSURE
FIG. 7
CLUTCH MODULATOR PRESSURE 76
TO MANUAL SHIFT VALVE 75
SOLENOID MODULATOR PRESSURE 83
TO PRIMARY SHEAVE 33
FIG. 8
TORQUE CAPACITY
SLT PRESSURE
FIG. 9
TORQUE CAPACITY
SLT PRESSURE

What is claimed is:

1. An oil pressure control apparatus of a continuously variable transmission, comprising:
   a continuously variable transmission apparatus-purposed hydraulic servo that provides a predetermined torque capacity for a continuously variable transmission apparatus by acting on the continuously variable transmission apparatus;
   a friction engagement element-purposed hydraulic servo that provides a predetermined torque capacity for a friction engagement element engageable during a run of a vehicle by acting on the friction engagement element;
   first pressure regulating means for controlling an oil pressure to be supplied to the continuously variable transmission apparatus-purposed hydraulic servo;
   second pressure regulating means for controlling an oil pressure to be supplied to the friction engagement element-purposed hydraulic servo; and
   a solenoid valve that outputs a signal pressure for controlling the first pressure regulating means and the second pressure regulating means,
wherein a setting is made such that a torque capacity of the friction engagement element based on a control pressure controlled by the second pressure regulating means becomes less than a torque capacity of the continuously variable transmission apparatus based on a control pressure controlled by the first pressure regulating means.

2. An oil pressure control apparatus of a continuously variable transmission according to claim 1, wherein a gain of the first pressure regulating means and a gain of the second pressure regulating means are set so that the torque capacity of the friction engagement element becomes less than the torque capacity of the continuously variable transmission apparatus.

3. An oil pressure control apparatus of a continuously variable transmission according to claim 1, further comprising a changeover valve that changes the oil pressure to be supplied to the friction engagement element-purposed hydraulic servo between the control pressure based on the second pressure regulating means and a working pressure based on a line pressure,
   wherein the changeover valve is switch-controlled so as to supply the control pressure based on the second pressure regulating means to the friction engagement element-purposed hydraulic servo when the vehicle is starting, and so as to supply the working pressure to the friction engagement element-purposed hydraulic servo when the vehicle is running after being started.

4. An oil pressure control apparatus of a continuously variable transmission according to claim 3, wherein when the vehicle is running after being started, the working pressure is set so that the torque capacity of the friction engagement element becomes greater than the torque capacity of the continuously variable transmission apparatus.

5. An oil pressure control apparatus of a continuously variable transmission according to claim 1, wherein the solenoid valve is a linear solenoid valve.

6. An oil pressure control apparatus of a continuously variable transmission according to claim 3, wherein the first pressure regulating means includes a primary regulator valve that outputs the line pressure.

7. An oil pressure control apparatus of a continuously variable transmission according to claim 1, wherein the first pressure regulating means comprises a continuously variable transmission apparatus-purposed control valve having:
    a control oil chamber that generates a first predetermined pressing force by receiving an output pressure of the solenoid valve on a predetermined pressure-receiving area;
    an input port;
    an output port that communicates with the continuously variable transmission apparatus-purposed hydraulic servo; and
    a feedback chamber that generates a second predetermined pressing force by receiving an output pressure of the output port on the predetermined pressure-receiving area,
wherein the continuously variable transmission apparatus-purposed control valve controls the output pressure of the output port based on the first predetermined pressing force and the second predetermined pressing force.

8. An oil pressure control apparatus of a continuously variable transmission according to claim 1, wherein the second pressure regulating means comprises a continuously variable transmission apparatus-purposed control valve having:
    a control oil chamber that generates a third predetermined pressing force by receiving an output pressure of the solenoid valve on a predetermined pressure-receiving area;
    an input port;
    an output port that communicates with the continuously variable transmission apparatus-purposed hydraulic servo; and
    a feedback chamber that generates a fourth predetermined pressing force by receiving an output pressure of the output port on the predetermined pressure-receiving area,
wherein the continuously variable transmission apparatus-purposed control valve controls the output pressure of the output port based on the third predetermined pressing force and the fourth predetermined pressing force.

9. An oil pressure control apparatus of a continuously variable transmission according to claim 6, wherein an output pressure of the solenoid valve is led to a control oil chamber of the primary regulator valve to control the line pressure, and the line pressure is supplied to an input port of a continuously variable transmission apparatus-purposed control valve.

10. An oil pressure control apparatus of a continuously variable transmission according to claim 6, further comprising a modulator valve having:
    an input port to which the line pressure is inputted;
    an output port that communicates with the friction engagement element-purposed hydraulic servo;
    a feedback chamber that communicates with the output port; and
    a spring that is disposed so as to face the feedback chamber and that has a predetermined pre-load,
wherein the modulator valve outputs a substantially constant oil pressure from the output port if the line pressure reaches at least a predetermined value.

11. An oil pressure control apparatus of a continuously variable transmission according to claim 10, wherein the oil pressure from the output port of the modulator valve is directly supplied as the working pressure to the friction engagement element-purposed hydraulic servo, and is led to an input port of a friction engagement element-purposed control valve.

12. An oil pressure control apparatus of a continuously variable transmission according to claim 10, wherein the oil pressure from the output port of the modulator valve is led to an input port of the solenoid valve.

13. An oil pressure control apparatus of a continuously variable transmission according to claim 10, further comprising a control valve having:
    an output port that communicates with a speed shift-purposed hydraulic servo for controlling a speed shift of the continuously variable transmission apparatus;
    an input port to which the line pressure is supplied;
    a first control oil chamber that communicates with a signal pressure of a continuously variable speed shift operation-purposed first solenoid valve; and
    a second control oil chamber that communicates with a signal pressure of a continuously variable speed shift operation-purposed second solenoid valve,
wherein the control valve changes its output port among a supply position, a discharge position and a blocking position in accordance with combinations of the signal pressure from the continuously variable speed shift operation-purposed first solenoid valve and the signal pressure from the continuously variable speed shift operation-purposed second solenoid valve, and
wherein the changeover valve is changed based on a combination of the continuously variable speed shift operation-purposed first solenoid valve and the continuously variable speed shift operation-purposed second solenoid valve which is other than the combinations corresponding to the supply position, the discharge position and the blocking position related to the control valve.

14. An oil pressure control apparatus of a continuously variable transmission according to claim 13, wherein the oil pressure from the output port of the modulator valve is led to an input side of the continuously variable speed shift operation-purposed first solenoid valve and an input side of the continuously variable speed shift operation-purposed second solenoid valve.

15. An oil pressure control apparatus of a continuously variable transmission according to claim 13, wherein the continuously variable transmission apparatus is a belt-type continuously variable transmission apparatus, and the continuously variable transmission apparatus-purposed hydraulic servo is a hydraulic servo that acts on a second pulley, and the speed shift-purposed hydraulic servo is a hydraulic servo that acts on a primary pulley.

16. An oil pressure control apparatus of a continuously variable transmission according to claim 3, further comprising:
- a forward-reverse drive switching apparatus having a forward drive-purposed friction engagement element and a reverse drive-purposed friction engagement element; and
- a manual valve that is switched so as to supply the control pressure and the working pressure to a hydraulic servo of the forward drive purposed-friction engagement element or a hydraulic servo of the reverse drive-purposed friction engagement element, wherein the friction engagement element-purposed hydraulic servo is the hydraulic servo of the forward drive purposed-friction engagement element and the hydraulic servo of the reverse drive-purposed friction engagement element.

* * * * *